US010243432B2

(12) United States Patent
Hieda et al.

(10) Patent No.: US 10,243,432 B2
(45) Date of Patent: Mar. 26, 2019

(54) ROTATION ANGLE DETECTION DEVICE

(71) Applicant: JTEKT CORPORATION, Osaka-shi, Osaka (JP)

(72) Inventors: Takahito Hieda, Kashihara (JP); Naoki Tani, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 232 days.

(21) Appl. No.: 15/157,977

(22) Filed: May 18, 2016

(65) Prior Publication Data
US 2016/0352190 A1 Dec. 1, 2016

(30) Foreign Application Priority Data

May 25, 2015 (JP) ................. 2015-105762

(51) Int. Cl.
| | | |
|---|---|---|
| *H02K 11/00* | (2016.01) | |
| *H02K 11/215* | (2016.01) | |
| *H02K 11/01* | (2016.01) | |
| *G01D 5/14* | (2006.01) | |
| *G01D 5/244* | (2006.01) | |
| *H02K 11/33* | (2016.01) | |

(52) U.S. Cl.
CPC .......... *H02K 11/215* (2016.01); *G01D 5/145* (2013.01); *G01D 5/24433* (2013.01); *H02K 11/01* (2016.01); *H02K 11/00* (2013.01); *H02K 11/33* (2016.01)

(58) Field of Classification Search
CPC ...... H02K 11/02; H02K 11/215; H02K 11/01; G02D 5/145; G02D 5/24433; G01D 5/145; G01D 5/24433

USPC ........................................................ 310/68 B
See application file for complete search history.

(56) References Cited

U.S. PATENT DOCUMENTS

| | | | | |
|---|---|---|---|---|
| 4,302,692 A | * | 11/1981 | Matsumoto ............ | H02K 29/14 310/113 |
| 5,325,005 A | * | 6/1994 | Denk ..................... | H02K 29/08 310/256 |

(Continued)

FOREIGN PATENT DOCUMENTS

| | | | | |
|---|---|---|---|---|
| JP | 10047994 A | * | 2/1998 | ............. G01D 5/245 |
| JP | 2010-085394 A | | 4/2010 | |

(Continued)

OTHER PUBLICATIONS

Nov. 29, 2016 Search Report issued in European Patent Application No. 16171101.5.

(Continued)

*Primary Examiner* — Burton S Mullins
(74) *Attorney, Agent, or Firm* — Oliff PLC

(57) ABSTRACT

A rotation angle detection device detects a rotation angle of a motor having a shaft passing through a heat-dissipation plate. The rotation angle detection device includes: a permanent magnet attached to a base end of the shaft; a board that is disposed above the heat-dissipation plate and on which a drive circuit of the motor and a control circuit of the drive circuit are mounted; a magnetic sensor that is provided on the board so as to face the permanent magnet; and a magnetic shielding member that has a tubular shape and is disposed between the heat-dissipation plate and the board to surround the permanent magnet in plan view.

6 Claims, 2 Drawing Sheets

(56) References Cited

U.S. PATENT DOCUMENTS

| | | | | |
|---|---|---|---|---|
| 6,268,722 | B1* | 7/2001 | Kogure | G01D 5/145 |
| | | | | 324/207.12 |
| 7,453,175 | B2* | 11/2008 | Nakanishi | H02K 7/20 |
| | | | | 310/68 B |
| 7,479,718 | B2* | 1/2009 | Kikuchi | H02K 11/046 |
| | | | | 310/68 D |
| 7,795,766 | B2* | 9/2010 | Kataoka | B62D 5/0403 |
| | | | | 310/68 B |
| 8,471,552 | B2* | 6/2013 | Suzuki | G01D 5/145 |
| | | | | 324/207.21 |
| 9,455,610 | B2* | 9/2016 | Tomizawa | H02K 29/08 |
| 2008/0024028 | A1* | 1/2008 | Islam | H02K 5/22 |
| | | | | 310/187 |
| 2011/0227563 | A1* | 9/2011 | Akahane | G01D 5/145 |
| | | | | 324/207.25 |
| 2012/0098529 | A1* | 4/2012 | Kurihara | G01D 5/145 |
| | | | | 324/207.25 |
| 2012/0286604 | A1 | 11/2012 | Abe et al. | |
| 2014/0145564 | A1 | 5/2014 | Taniguchi et al. | |
| 2014/0246958 | A1* | 9/2014 | Taniguchi | H02K 21/14 |
| | | | | 310/68 B |
| 2014/0312746 | A1* | 10/2014 | Taniguchi | H02K 29/08 |
| | | | | 310/68 B |
| 2014/0339966 | A1 | 11/2014 | Tomizawa et al. | |

FOREIGN PATENT DOCUMENTS

| | | | |
|---|---|---|---|
| JP | 2014-107973 A | 6/2014 | |
| JP | 2014-225998 A | 12/2014 | |
| JP | 2015-027200 | * 2/2015 | H02K 11/00 |
| JP | 2015-109727 A | 6/2015 | |
| WO | WO 2013084270 | * 4/2015 | |

OTHER PUBLICATIONS

Feb. 7, 2019 Office Action issued in Japanese Patent Application No. JP2015-105762.

* cited by examiner

101

ROTATION ANGLE DETECTION DEVICE

INCORPORATION BY REFERENCE

The disclosure of Japanese Patent Application No. 2015-105762 filed on May 25, 2015 including the specification, drawings and abstract, is incorporated herein by reference in its entirety.

BACKGROUND OF THE INVENTION

1. Field of the Invention

The present invention relates to a rotation angle detection device including a permanent magnet and a magnetic sensing element.

2. Description of Related Art

In recent years, a noncontact rotation angle detection device has been developed that detects the rotation angle of a motor with a permanent magnet and a magnetic sensing element that are disposed apart from each other. Such a rotation angle detection device is described in Japanese Patent Application Publication No. 2014-225998 (JP 2014-225998 A), for example. JP 2014-225998 A describes a motor case, a motor accommodated in the motor case, a first frame (metal plate), a control board (board), and a rotation angle detection device. The motor case is enclosed with the first frame. The control board is disposed above the first frame spaced apart from the first frame. The motor includes a shaft (rotary shaft) passing through the first frame (metal plate) and having an end that protrudes upward from the first frame (metal plate).

The rotation angle detection device includes a magnet (permanent magnet) and a position detection sensor (magnetic sensing element). The magnet is attached to the an end of the shaft. The position detection sensor is mounted on the control board. The magnet and the position detection sensor are disposed so as to face each other.

In such a rotation angle detection device having a structure in which a magnetic sensing element and a permanent magnet face each other as in JP 2014-225998 A, magnetism of the permanent magnet affects circuit components mounted on the board in addition to the magnetic sensing element. Consequently, normal operation of the circuit components may be hindered. Specifically, when a drive circuit of a motor and a control circuit of the drive circuit, etc. are mounted on the board, the drive circuit and the control circuit, etc. may receive the influence of the magnetism of the permanent magnet, thus resulting in malfunction. Meanwhile, magnetism generated by currents flowing in the drive circuit and the control circuit, etc. is detected by the magnetic sensing element. Consequently, distortion, noise, etc. may be generated in detection signals of the magnetic sensing element.

SUMMARY OF THE INVENTION

An object of the present invention is to provide a rotation angle detection device that can reduce inconvenience due to magnetism generated at a permanent magnet and a board to improve reliability.

An aspect of the present invention relates to a rotation angle detection device that detects a rotation angle of a motor having a rotary shaft passing through a metal plate. The rotation angle detection device includes: a permanent magnet attached to one end of the rotary shaft; a board that faces the metal plate on the opposite side of the permanent magnet from the metal plate and on which at least one of a drive circuit of the motor and a control circuit of the drive circuit is mounted; a magnetic sensing element that is provided on the board so as to face the permanent magnet; and a magnetic shielding member that has a tubular shape and is disposed between the metal plate and the board so as to surround the permanent magnet in plan view.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
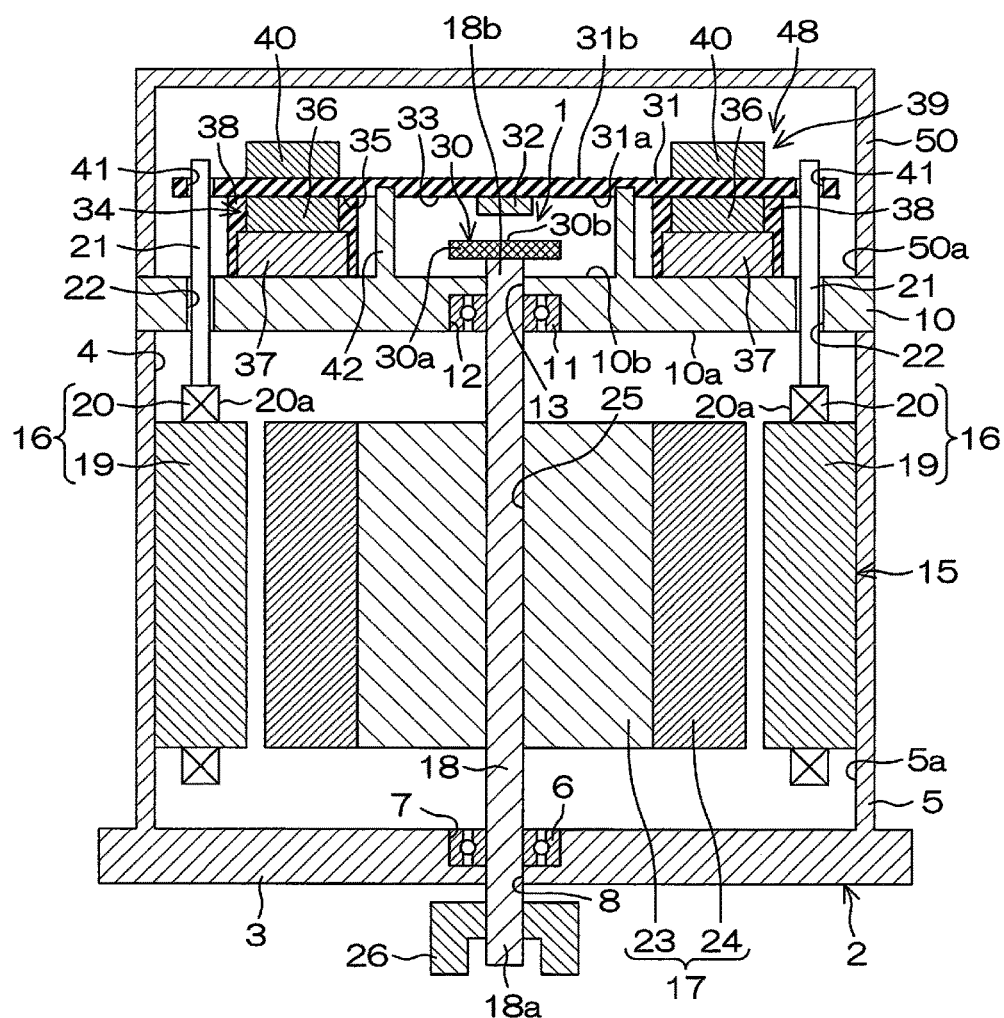
FIG. 1 is a schematic sectional view illustrating an integrated motor/ECU to which a rotation angle detection device according to an embodiment of the present invention is applied.

Embodiments of the present invention will now be described in detail with reference to the accompanying drawings. FIG. 1 is a schematic sectional view illustrating an integrated motor/electronic control unit (ECU) 101 to which a rotation angle detection device 1 according to an embodiment of the present invention is applied. In the present embodiment, the integrated motor/ECU 101 is an integrated motor/ECU for an electric power steering (EPS), which integrally includes a motor 15 and an ECU 48 described later. The following describes a structure of the integrated motor/ECU 101 in more detail.

The integrated motor/ECU 101 includes a motor housing 2. The motor housing 2 has a bottomed cylindrical shape and integrally has a disk-shaped bottom wall 3 and a cylindrical side wall 5. The side wall 5 is provided on the periphery of the bottom wall 3, and has an opening 4 on the opposite side of the side wall 5 from the bottom wall 3. The motor housing 2 has on the bottom wall 3 a first bearing holding portion 7 for holding a first bearing 6. The first bearing holding portion 7 is a recess that is recessed one step lower in a generally circular shape in plan view at the center of the bottom wall 3. In this recess, the first bearing 6 is accommodated and held. The first bearing 6 is a ball bearing in the present embodiment. At the center of the bottom of the first bearing holding portion 7, a through hole 8 passing through the bottom wall 3 is formed. The opening 4 of the motor housing 2 is closed by a metallic (e.g., aluminum) heat-dissipation plate (metal plate) 10 that is generally disk-shaped.

The heat-dissipation plate 10 has a first main surface 10a that faces the bottom wall 3 of the motor housing 2 and a second main surface 10b that is on the opposite side therefrom. The heat-dissipation plate 10 has a second bearing holding portion 12 for holding a second bearing 11 at the center of the first main surface 10a. The second bearing holding portion 12 is a recess that is recessed one step lower in a circular shape in plan view at the center of the first main surface 10a of the heat-dissipation plate 10. In this recess, the second bearing 11 is accommodated and held. The second bearing 11 is a ball bearing in the present embodiment. At the center of the bottom of the second bearing holding portion 12, a through hole 13 passing through the heat-dissipation plate 10 is formed. The motor 15 is accommodated in the motor housing 2 enclosed with the heat-dissipation plate 10.

The motor 15 is a three-phase brushless motor in the present embodiment. The motor 15 includes a stator 16 having a cylindrical shape, a rotor 17, and a shaft (rotary shaft) 18 having a columnar shape. The stator 16 is fixed to an inner peripheral surface 5a of the side wall 5 of the motor housing 2. The rotor 17 is disposed on the radially inner side of the stator 16. The shaft 18 is attached to the rotor 17 so as to pass through the center of the rotor 17. The stator 16 has a plurality of stator teeth 19 and stator coils 20. The stator teeth 19 extend radially inward from the inner peripheral surface 5a of the side wall 5 of the motor housing 2. The stator coils 20 are wound around the stator teeth 19. The stator coils 20 include a U-phase coil, a V-phase coil, and a W-phase coil that correspond to the U-phase, the V-phase, and the W-phase, respectively, of the motor 15. To one end 20a of each stator coil 20 positioned on the heat-dissipation plate 10 side, a motor bus bar 21 having a columnar shape is electrically connected. The motor bus bars 21 extend to the second main surface 10b side of the heat-dissipation plate 10 through bus-bar through holes 22 formed in the heat-dissipation plate 10.

The rotor 17 includes a rotor core 23 having a columnar shape and a permanent magnet 24. The rotor core 23 rotates integrally with the shaft 18. The permanent magnet 24 is fixed to the outer periphery of the rotor core 23. The rotor core 23 is formed of soft magnetic material, and a shaft through hole 25 is formed at the center thereof in plan view. The permanent magnet 24 is a ring-shaped magnet that is magnetized alternately with S and N poles along the circumferential direction of the rotor core 23.

The shaft 18 is inserted into the shaft through hole 25 of the rotor core 23 and is fixed thereto. The shaft 18 is formed of non-magnetic metal such as stainless steel (SUS). The shaft 18 is rotatably supported by the first bearing 6 and the second bearing 11. The first bearing 6 is provided on the bottom wall 3 of the motor housing 2. The second bearing 11 is provided in the first main surface 10a of the heat-dissipation plate 10. Thus, the rotor 17 is rotatably supported within the motor housing 2. In this structure, the shaft 18 has a distal end 18a and a base end (one end) 18b. The distal end 18a passes through the through hole 8 to protrude outside the motor housing 2. The base end 18b passes through the through hole 13 to protrude to the second main surface 10b side of the heat-dissipation plate 10.

To the distal end 18a of the shaft 18, a coupling member 26 is attached. The coupling member 26 is connected to a mechanism (e.g., speed reducer for the EPS) outside the integrated motor/ECU 101. Thus, rotation drive force of the motor 15 is transmitted to this outside mechanism (e.g., speed reducer for the EPS). To the base end 18b of the shaft 18, a permanent magnet 30 that is generally disk-shaped is attached so as to rotate integrally with the shaft 18.

The permanent magnet 30 is magnetized alternately with S and N poles along the circumferential direction thereof. As depicted in FIG. 1, the permanent magnet 30 may be formed in a shape wider than the radial width of the shaft 18 so that a periphery 30a of the permanent magnet 30 faces the second main surface 10b. The permanent magnet 30 may have a width that is substantially the same as the radial width of the shaft 18. On the opposite side of the permanent magnet 30 from the heat-dissipation plate 10, a board 31 that is generally disk-shaped is disposed so as to face the second main surface 10b of the heat-dissipation plate 10.

The board 31 is disposed a predetermined distance (e.g., about five millimeters) apart from the heat-dissipation plate 10 in the axial direction of the shaft 18. The board 31 has a facing surface 31a that faces the second main surface 10b of the heat-dissipation plate 10 and a non-facing surface 31b that is on the opposite side therefrom. The board 31 may be a multilayer wiring board, for example. The multilayer wiring board may have a plurality of insulating layers, a plurality of wiring layers, and via holes. The via hole electrically connects between the wiring layers disposed on the upper and lower sides of the insulating layer. On a central portion of the facing surface 31a of the board 31, a sensor mounting area 33 is defined that has a generally circular shape in plan view and on which a magnetic sensor (magnetic sensing element) 32 is mounted. On a peripheral portion of the facing surface 31a of the board 31, a drive circuit mounting area 35 is defined that has a generally annular shape in plan view and on which a drive circuit 34 is mounted, so as to surround the sensor mounting area 33.

In the sensor mounting area 33, the magnetic sensor 32 is disposed within an area that faces the entire area of a plate surface 30b of the permanent magnet 30. More specifically, the magnetic sensor 32 is disposed at a position that corresponds to the position of the rotation center of the shaft 18 in the facing surface 31a of the board 31. Thus, the magnetic sensor 32 faces the permanent magnet 30 with a space interposed therebetween. The magnetic sensor 32 detects a magnetic field (magnetic flux) from the permanent magnet 30 that varies in accordance with the rotation of the shaft 18. The permanent magnet 30 and the magnetic sensor 32 constitute part of the rotation angle detection device 1. The rotation angle detection device 1 includes a computation unit (not depicted) that computes the rotation angle of the motor 15 on the basis of output of the magnetic sensor 32.

The drive circuit 34 is a three-phase inverter circuit that supplies power to the motor 15, and includes a plurality of switching elements 36 corresponding to the U-phase, the V-phase, and the W-phase of the motor 15. The switching elements 36 are each thermally connected to the heat-dissipation plate 10 via a metallic heat-dissipating member 37. The switching elements 36 and the heat-dissipating member 37 connected to the switching elements 36 are sealed with a sealing resin 38.

On the non-facing surface 31b of the board 31, a control circuit 39 is mounted that is electrically connected to the drive circuit 34 to control the drive circuit 34. In other words, the board 31 is a complex circuit board in which the drive circuit 34 of the motor 15 and the control circuit 39 of the drive circuit 34 are mounted on the lower and the upper surfaces (the facing surface 31a and the non-facing surface 31b), respectively, of the board 31. The control circuit 39 includes a microcomputer 40 that executes a predetermined operation program stored in a memory. To the control circuit 39, the motor bus bars 21 are electrically connected that extend to the non-facing surface 31b side of the board 31 through bus-bar through holes 41 formed in the board 31.

The drive circuit 34 and the control circuit 39 that are mounted on the board 31 constitute part of the ECU 48. In the ECU 48, the control circuit 39 controls the drive circuit 34 to cause the switching elements 36 to perform on/off control. Thus, signals for sine-wave drive of the motor 15 are output from the drive circuit 34 to the motor bus bars 21. The signals output to the motor bus bars 21 are transmitted to the stator 16. This achieves sine-wave drive of the motor 15.

Figure 2:
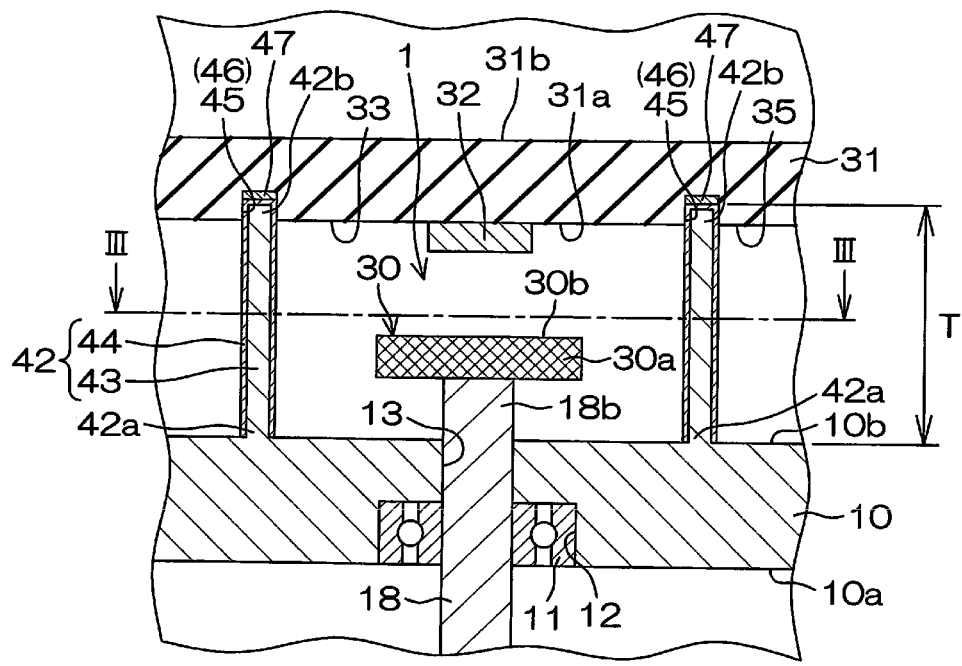
FIG. 2 is an enlarged sectional view illustrating a magnetic shielding member in FIG. 1.
Figure 3:
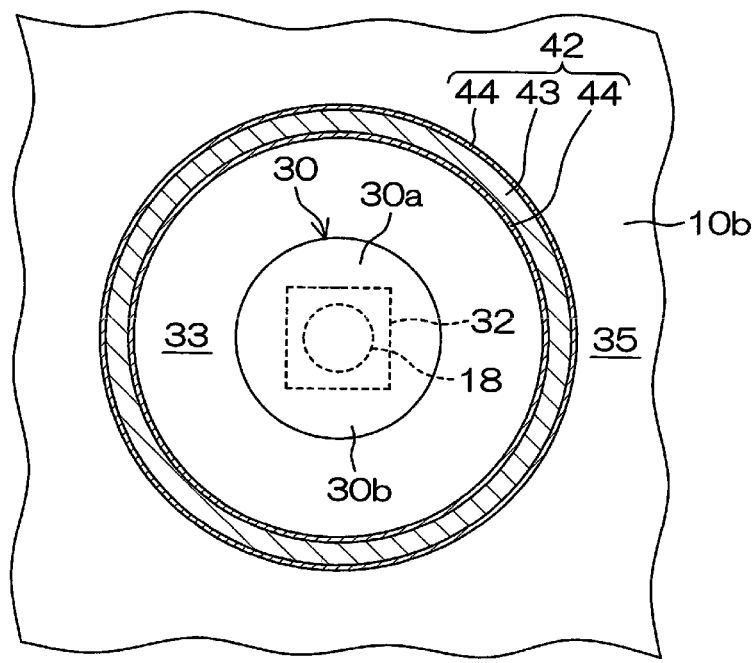
FIG. 3 is a sectional view taken along line indicated in FIG. 2.

Between the heat-dissipation plate 10 and the board 31, a magnetic shielding member 42 containing ferromagnetic material is disposed. The following described a specific structure of the magnetic shielding member 42 with reference to FIG. 2 and FIG. 3. FIG. 2 is an enlarged sectional view illustrating a main part of the magnetic shielding member 42 in FIG. 1. FIG. 3 is a sectional view along line III-III indicated in FIG. 2. As depicted in FIG. 2 and FIG. 3, the magnetic shielding member 42 has a tubular shape, and is disposed so as to surround the permanent magnet 30 and the magnetic sensor 32 in plan view. In the present embodiment, an example is described in which the magnetic shielding member 42 is formed in a generally round tubular shape. However, the magnetic shielding member 42 may have a generally rectangular tubular shape. Height T of the magnetic shielding member 42 from the second main surface 10b of the heat-dissipation plate 10 is about five millimeters, for example.

The magnetic shielding member 42 has a heat-dissipation plate-side end 42a positioned on the heat-dissipation plate 10 side and a board-side end 42b positioned on the board 31 side. The heat-dissipation plate-side end 42a of the magnetic shielding member 42 is integrated with the heat-dissipation plate 10. The board-side end 42b of the magnetic shielding member 42 is in contact with the board 31. In the present embodiment, the magnetic shielding member 42 is made of the same material as that of the heat-dissipation plate 10, and includes an aluminum body 43 and a plating film 44. The body 43 is integrated with the heat-dissipation plate 10. The plating film 44 coats the entire surface of the body 43. The plating film 44 is made of ferromagnetic material such as nickel (Ni).

As depicted in FIG. 2, an engagement portion 45 that engages with the board-side end 42b of the magnetic shielding member 42 is formed on the board 31. In the present embodiment, the engagement portion 45 is a recess 46 that is formed in a generally annular shape in plan view so that the board-side end 42b of the magnetic shielding member 42 is fitted thereinto. On the board 31, a ground wire 47 is formed that provides ground potential (reference voltage) to the drive circuit 34 and/or the control circuit 39. The ground wire 47 is made of copper foil, for example. The recess 46 (engagement portion 45) is formed on the board 31 so that the ground wire 47 is partially exposed. The board-side end 42b of the magnetic shielding member 42 is fitted into (engaged with) the recess 46 (engagement portion 45) formed on the board 31. The board-side end 42b of the magnetic shielding member 42 is electrically connected to the ground wire 47 in the recess 46 (engagement portion 45).

The sensor mounting area 33 in which the magnetic sensor 32 is mounted and the drive circuit mounting area 35 in which the drive circuit 34 is mounted are magnetically isolated from each other by the magnetic shielding member 42. More specifically, the magnetic shielding member 42 blocks the magnetic path connecting between the permanent magnet 30 and the drive circuit 34 (drive circuit mounting area 35) on the board 31. Furthermore, the magnetic shielding member 42 blocks the magnetic path connecting between the magnetic sensor 32 (sensor mounting area 33) and the drive circuit 34 (drive circuit mounting area 35).

Returning to FIG. 1, a cover member 50, which has a bottomed cylindrical shape and has an opening 50a on the motor housing 2 side, is attached to the heat-dissipation plate 10 so as to accommodate the board 31 between the cover member 50 and the heat-dissipation plate 10. As described in the foregoing, in the present embodiment, the magnetic shielding member 42 having a generally round tubular shape is disposed between the heat-dissipation plate 10 and the board 31 so as to surround the permanent magnet 30 and the magnetic sensor 32 in plan view. Thus, the inconvenience due to magnetism generated at the permanent magnet 30 and the board 31 can be reduced, whereby reliability is improved. More specifically, the magnetic shielding member 42 can block the magnetic path connecting between the permanent magnet 30 and the drive circuit 34 (drive circuit mounting area 35) on the board 31, whereby magnetism of the permanent magnet 30 can be prevented from affecting the drive circuit 34. Thus, the drive circuit 34 (e.g., the switching elements 36) can be prevented from malfunctioning due to magnetism of the permanent magnet 30. Because malfunction of the drive circuit 34 can be prevented, malfunction of the control circuit 39 (e.g., the microcomputer 40) electrically connected to the drive circuit 34 can also be prevented.

The magnetic shielding member 42 can block the magnetic path connecting between the magnetic sensor 32 and the drive circuit 34. Thus, the magnetic sensor 32 can be prevented from being affected by the magnetism generated on the drive circuit 34 side. Especially in the present embodiment, the magnetic shielding member 42 can block magnetism generated in the motor bus bars 21 through which a relatively large current flows and magnetism generated in the switching elements 36, for example. Thus, the magnetism generated on the drive circuit 34 side can be prevented from being detected by the magnetic sensor 32. Consequently, magnetism of the permanent magnet 30 can be appropriately detected by the magnetic sensor 32, whereby the detection accuracy of the magnetic sensor 32 can be improved.

In the present embodiment, inconvenience due to magnetism generated at the permanent magnet 30 and the board 31 can be reduced by the magnetic shielding member 42. Thus, the permanent magnet 30 and the board 31 (the drive circuit 34 and the control circuit 39) can be disposed relatively close to each other. This can contribute to downsizing and cost reduction of the integrated motor/ECU 101. Especially in the present embodiment, a structure is used in which the drive circuit 34 and the control circuit 39 are mounted on the lower and the upper surfaces (the facing surface 31a and the non-facing surface 31b), respectively, of the board 31. This can further contribute to downsizing and cost reduction of the integrated motor/ECU 101.

In the present embodiment, the recess 46 (engagement portion 45) into (with) which the board-side end 42b of the magnetic shielding member 42 is fitted (engaged) is formed on the board 31. Fitting (engaging) the board-side end 42b of the magnetic shielding member 42 into (with) the recess 46 (engagement portion 45) facilitates positioning of the board 31 with respect to the heat-dissipation plate 10. Because accuracy in positioning the board 31 with respect to the heat-dissipation plate 10 can be improved, accuracy in positioning the permanent magnet 30 and the magnetic sensor 32 can also be improved. This can further improve the detection accuracy of the magnetic sensor 32.

In the present embodiment, the second bearing holding portion 12 (recess) for holding the second bearing 11 is formed on the first main surface 10a of the heat-dissipation plate 10. This enables positioning of the shaft 18 (motor 15) with a relatively compact design. Because accuracy in positioning the shaft 18 can be improved, accuracy in positioning the permanent magnet 30 attached to the shaft 18 and the magnetic sensor 32 can also be improved. This can further improve the detection accuracy of the magnetic sensor 32.

In the present embodiment, the board-side end 42b of the magnetic shielding member 42 is electrically connected to the ground wire 47 in the recess 46 (engagement portion 45). This makes it possible to electrically connect between the ground wire 47 formed on the board 31 and the heat-dissipation plate 10 through the magnetic shielding member 42, and thus the wiring area of the ground wire 47 can be increased. Consequently, stability of the ground potential can be improved. This can reduce noise generated at the board 31 (the drive circuit 34 and the control circuit 39).

An embodiment of the present invention has been described in the foregoing, but the present invention can be implemented in another form. For example, in the embodiment described above, an example has been described in which the drive circuit 34 is mounted on the facing surface 31a of the board 31, and the control circuit 39 is mounted on the non-facing surface 31b of the board 31. However, the drive circuit 34 may be mounted on the non-facing surface 31b of the board 31, and the control circuit 39 may be mounted on the facing surface 31a of the board 31. With this structure, the magnetic shielding member 42 can block the magnetic path connecting between the control circuit 39 and the permanent magnet 30. Furthermore, the magnetic shielding member 42 can block the magnetic path connecting between the control circuit 39 and the magnetic sensor 32. The drive circuit 34 and the control circuit 39 may be formed on different boards. In other words, either one of the drive circuit 34 and the control circuit 39 may be mounted on the board 31.

In the embodiments described above, an example has been described in which the magnetic shielding member 42 and the heat-dissipation plate 10 are integrally formed. However, the magnetic shielding member 42 that is separate from the heat-dissipation plate 10 may be provided. In this case, the magnetic shielding member 42 may be formed of ferromagnetic material such as nickel. In the embodiment described above, an example has been described in which the plating film 44 containing ferromagnetic material such as nickel is formed only on the magnetic shielding member 42. This plating film 44 may be formed so as to coat a partial area or the entire area of the second main surface 10b of the heat-dissipation plate 10. With this structure, the partial area or the entire area of the second main surface 10b of the heat-dissipation plate 10 can be used as a magnetic shielding member.

In the embodiment described above, an example has been described in which the magnetic shielding member 42 is electrically connected to the ground wire 47 formed on the board 31. However, the board 31 and the heat-dissipation plate 10 may be thermally connected to each other by connecting the magnetic shielding member 42 to a metallic film for heat dissipation that is formed on the board 31. Needless to say, the ground wire 47 may serve also as the metallic film for heat dissipation. In the embodiments described above, an example has been described in which the ground wire 47 is formed so as to be exposed from the recess 46 (engagement portion 45) of the board 31. However, the ground wire 47 may be formed on the non-facing surface 31b of the board 31. In this case, in the recess 46 (engagement portion 45), the board-side end 42b of the magnetic shielding member 42 may be electrically connected to the ground wire 47 on the non-facing surface 31b of the board 31 through a via hole that is formed passing through the board 31. With this structure, the via hole passing through the board 31 may be formed after the recess 46 (engagement portion 45) is formed on the facing surface 31a of the board 31, and then the ground wire 47 covering the via hole may be formed on the non-facing surface 31b of the board 31, which facilitates manufacturing.

In addition, various design changes may be made within the scope of the matters described in the claims.

What is claimed is:

1. A rotation angle detection device that detects a rotation angle of a motor having a rotary shaft passing through a metal plate, the rotation angle detection device comprising:
    a permanent magnet attached to one end of the rotary shaft;
    a printed circuit board that faces the metal plate on an opposite side of the permanent magnet from the metal plate and on which at least one of a drive circuit of the motor and a control circuit of the drive circuit is mounted;
    a magnetic sensing element that is provided on the board so as to face the permanent magnet; and
    a magnetic shielding member that has a tubular shape and is disposed between the metal plate and the board so as to be in contact with the printed circuit board and to surround the permanent magnet and the magnetic sensing element in plan view,
    wherein at least one of the drive circuit and the control circuit is arranged radially outside the magnetic shielding member in the plan view.

2. The rotation angle detection device according to claim 1, wherein
    the board includes an engagement portion that engages with a board-side end of the magnetic shielding member.

3. The rotation angle detection device according to claim 2, wherein
    the engagement portion is a recess into which the board-side end of the magnetic shielding member is fitted.

4. The rotation angle detection device according to claim 1, wherein
    the magnetic shielding member is integrated with the metal plate.

5. The rotation angle detection device according to claim 1, wherein
    a ground wire is formed on the board, and the magnetic shielding member is electrically connected to the ground wire.

6. The rotation angle detection device according to claim 1, wherein
    an axial end of the magnetic shielding member that directly contacts the board has an annular shape.

* * * * *